United States Patent
Winder

(10) Patent No.: US 8,712,159 B2
(45) Date of Patent: Apr. 29, 2014

(54) IMAGE DESCRIPTOR QUANTIZATION

(75) Inventor: Simon Winder, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 81 days.

(21) Appl. No.: 13/487,181

(22) Filed: Jun. 2, 2012

(65) Prior Publication Data

US 2012/0237134 A1 Sep. 20, 2012

Related U.S. Application Data

(62) Division of application No. 12/098,458, filed on Apr. 7, 2008, now Pat. No. 8,208,731.

(51) Int. Cl.
*G06K 9/46* (2006.01)
*G06K 9/00* (2006.01)
*G06K 9/60* (2006.01)

(52) U.S. Cl.
USPC ............ 382/190; 382/118; 382/303; 382/253

(58) Field of Classification Search
USPC ........................... 382/224, 190, 118, 303, 253
See application file for complete search history.

(56) References Cited

U.S. PATENT DOCUMENTS

| | | | |
|---|---|---|---|
| 6,850,639 B2 * | 2/2005 | Song et al. ................... 382/162 |
| 7,003,518 B2 | 2/2006 | Lee et al. | |
| 7,126,720 B2 | 10/2006 | Lee et al. | |
| 7,212,671 B2 | 5/2007 | Kim et al. | |
| 7,295,718 B2 | 11/2007 | Park et al. | |
| 2001/0056419 A1 * | 12/2001 | Lee ................................... 707/6 |
| 2002/0034333 A1 | 3/2002 | Vishwanath et al. | |
| 2002/0106122 A1 * | 8/2002 | Messing et al. ............... 382/162 |
| 2003/0072366 A1 * | 4/2003 | Bartolucci et al. ........ 375/240.04 |
| 2004/0179719 A1 | 9/2004 | Chen | |
| 2005/0090996 A1 | 4/2005 | Gattiker | |
| 2005/0201595 A1 * | 9/2005 | Kamei ........................... 382/118 |
| 2005/0225678 A1 | 10/2005 | Zisserman et al. | |
| 2006/0077408 A1 | 4/2006 | Amirghodsi | |
| 2006/0093221 A1 | 5/2006 | Kasutani | |
| 2007/0014435 A1 * | 1/2007 | Mirowski et al. ............. 382/109 |
| 2007/0127812 A1 | 6/2007 | Strom et al. | |
| 2007/0127813 A1 * | 6/2007 | Shah ............................. 382/170 |
| 2007/0143108 A1 * | 6/2007 | Kurozumi et al. ............ 704/239 |
| 2007/0214172 A1 * | 9/2007 | Nister et al. .................. 707/102 |
| 2007/0230773 A1 | 10/2007 | Nagao et al. | |
| 2008/0137966 A1 | 6/2008 | Witt | |
| 2009/0185746 A1 * | 7/2009 | Mian et al. .................... 382/209 |

OTHER PUBLICATIONS

Koskela, M., J. Laaksonen, E. Oja, Using MPEG-7 descriptors in image retrieval with self-organizing maps, 16th Int'l Conf. on Pattern Recognition, ICPR 2002, Aug. 11-15, 2002, pp. 1049-1052, Quebec, Canada.

(Continued)

*Primary Examiner* — Kathleen Y Dulaney
(74) *Attorney, Agent, or Firm* — Steve Wight; Carole Boelitz; Micky Minhas

(57) ABSTRACT

Image descriptor quantization technique embodiments are presented which quantize an image descriptor defined by a vector of number elements. This is generally accomplished by lowering the number of bits per number element to a prescribed degree. The resulting quantized image descriptor exhibits minimal loss of matching reliability while at the same time reducing the amount of storage space needed to store the descriptor in a database. Lowering the number of bits per number element also allows for increased matching speed.

5 Claims, 3 Drawing Sheets

(56) References Cited

OTHER PUBLICATIONS

Ramaswamy, S., K. Rose, Adaptive cluster-distance bounding for nearest neighbor search in image databases, Proc. of the Int'l Conf. on Image Processing, ICIP 2007, Sep. 16-19, 2007, pp. 381-384, San Antonio, Texas, USA.

Wang, X.-J., L. Zhang, F. Jing, W.-Y. Ma, Image annotation using search and mining technologies, Proc. of the 15th Int'l Conf. on World Wide Web, WWW 2006, May 23-26, 2006, pp. 1045-1046, Edinburgh, Scotland, UK.

* cited by examiner

IMAGE DESCRIPTOR QUANTIZATION

CROSS REFERENCE TO RELATED APPLICATION

This application is a divisional of a prior application entitled "IMAGE DESCRIPTOR QUANTIZATION", which was assigned Ser. No. 12/098,458 and filed Apr. 7, 2008.

BACKGROUND

Image descriptors are used for a variety of tasks in graphics and computer vision where matching one image to another is desired. For example, image descriptors are often used for 3D reconstruction tasks, and as a first stage in object or place recognition. Image descriptors are also used for searching databases of photographs. For instance, a query image, such as one captured by a cell phone camera, can be matched into a database containing thousands or millions of images of locations in a city. Rather than storing images, descriptors which characterize each image are stored. This allows a quick and efficient search process to match descriptors extracted from the query image to those in the database. An image descriptor is a vector of numbers which are ideally invariant to common image transformations and can be compared with other descriptors in a database to obtain matches according to a distance metric.

SUMMARY

The image descriptor quantization technique embodiments described herein generally quantize an image descriptor defined by a vector of number elements by lowering the number of bits per number element to a prescribed degree. This results in a quantized image descriptor that exhibits minimal loss of matching reliability while at the same time reducing the amount of storage space needed to store the descriptor in a database. Lowering the number of bits per number element also allows for increased matching speed.

In one general implementation each number element of the vector defining the image descriptor is quantized so that it falls within a prescribed integer range limit. The resulting vector is then designated as representing the quantized image descriptor. In one embodiment the quantization involves scaling down each number element. In another embodiment, the quantization involves dividing each number element.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of image descriptor quantization technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Image Descriptor Quantization Technique Embodiments

The image descriptor quantization technique embodiments described herein generally lower the number of bits per descriptor number element with minimal loss of matching reliability while reducing the amount of storage space needed to store the descriptors in a database. Lowering the number of bits per descriptor number elements also allows for increased matching speed.

Figure 1:
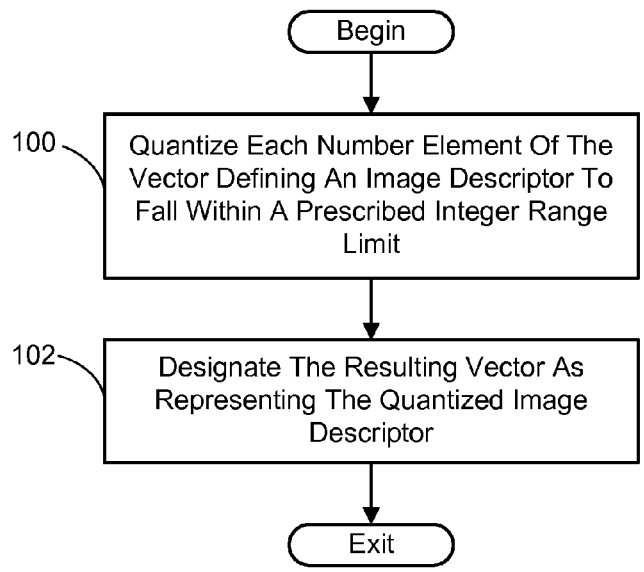
FIG. 1 is a flow diagram outlining one general embodiment of a process for quantizing an image descriptor.

In one general implementation outlined in FIG. 1, the foregoing is accomplished by first quantizing each number element of the vector defining an image descriptor so that it falls within a prescribed integer range limit (100). The resulting vector is then designated as representing the quantized image descriptor (102).

An exemplary description of the creation of an image descriptor that is amenable to the implementation of the image descriptor quantization technique embodiments will now be provided. This will be followed by a description of the image descriptor quantization technique embodiments themselves. It is noted that the image descriptor quantization technique embodiments can be implemented successfully with many types of image descriptors, and that it is not intended to limit the technique embodiments to just the following exemplary descriptor.

1.1 Exemplary Image Descriptor Generation Process

The input to the image descriptor generation process is a square image patch and the output is a vector of numbers representing the descriptor.

1.1.1 Image Patch Preparation

While, a descriptor generated using the following technique will be tolerant of variation in common image characteristics, the situation may be different for variations in rotation and scale. When comparing descriptors generated for a pair of image patches from different images but depicting the same 3D point, matching the descriptors could be adversely affected by differences in the rotation of the scene appearing in the respective image patches, as well as the respective scale of the scene in the two patches.

In view of the rotation and scale issue, each image patch that a descriptor is to be generated for, is first normalized as to its scale and rotation to match a canonical scale and rotation. One way of accomplishing the rotation normalization task is to use a gradient approach. This approach involves computing a local reference direction associated with a prescribed point in the patch (such as the interest point of the patch) using a standard gradient analysis of the image patch pixels. The patch is then rotated about the prescribed point so that its local reference direction matches a prescribed canonical direction, prior to computing its local image descriptor. In this way, if an image patch depicts the same 3D point as another patch, but rotated, both patches would be rotationally brought into sync prior to generating descriptors. As such the descriptor should match more closely than they might if the descriptors were computed with the patches in their original condition.

Similarly, conventional procedures can be employed to determine the scale of each image patch, and to adjust it to match a prescribed canonical scale, prior to being processed using the present local image descriptor generation technique. In this way, the patches will have matching scales and so a pair of patches depicting the same 3D point should match more closely than they might if the descriptors were computed with the patches at their original scales.

1.1.2 Image Descriptor Generation

The image descriptor generation process involves four stages. The first stage involves smoothing the image patch, the second stage involves the use of a transformation, the third stage involves spatial pooling, and the final stage involves normalization. In one example, a 64×64 pixel image patch is used as the input, and the output is a vector of size kN. As will be described in the sections to follow, k refers to the size of a transform vector computed in the transform phase for each of a set of sample points, and N refers to the number of linearly summed vectors that are produced by spatially accumulating weighted transform vectors around each of a group of pooling points.

Each of the aforementioned stages will now be described in turn.

1.1.2.1 Smoothing

The pixels of the image patch are first smoothed before any other processing takes place. In one example, the smoothing is accomplished using a Gaussian kernel of standard deviation $\sigma_{smoothing}$, such as one between about 0.5 and about 3.0.

The smoothing makes the generation process less sensitive to noise in the interest point location associated with the image patch. Typically, the degree of the smoothing is made greater in direct proportion to the amount of noise. The smoothing also reduces aliasing in the subsequent steps of the process. Finally, as will be described shortly, the value of $\sigma_{smoothing}$ establishes a scale for transformations involving a Difference of Gaussian (DoG) approach.

1.1.2.2 Transformation

The transformation phase generally maps the smoothed input patch onto a grid with one length k vector having positive elements for each output sample. In one example of this transformation, the output grid was given the same resolution as the input patch, although this need not be the case.

While any conventional transformation technique could be employed for this phase, three types are known to produce good results. The first type is gradient vector transformation. This generally involves evaluating the gradient $\nabla$ at each of a set of sample points in the image patch and rectifying the x and y components to produce a vector of length 4:

$\{|\nabla_x|-\nabla_x; |\nabla_x|+\nabla_x; |\nabla_y|-\nabla_y; |\nabla_y|+\nabla_y\}$.

This vector represents a natural sine-weighted quantization of orientation into 4 directions.

In an alternate embodiment of the gradient vector transformation approach the rectified gradient vector is extended to eight positive elements by concatenating the original four direction gradient vector with an additional four element gradient vector representing a 45 degree rotation of the original vector:

$\{|\nabla_x|-\nabla_x; |\nabla_x|+\nabla_x; |\nabla_y|-\nabla_y; |\nabla_y|+\nabla_y; |\nabla_{45_x}|-\nabla_{45_x}; |\nabla_{45_x}|+\nabla_{45_x}; |\nabla_{45_y}|-\nabla_{45_y}; |\nabla_{45_y}|+\nabla_{45_y}\}$ The second transformation type is steerable filter transformation. This generally involves applying steerable filters at each of a set of sample points in the image patch using d orientations to produce d quadrature response pairs for each point. The odd and even components of each quadrature response pair are rectified to produce 4 elements, respectively:

$\{|even|-even; |even|+even; |odd|-odd; |odd|+odd\}$.

These are then concatenated and in this way, a rectified quadrature response pair vector is created for each sample point having k=4d positive vector elements.

Two kinds of steerable filters are known to produced acceptable results—namely, those based on second derivatives provide broad orientation tuning, while fourth order filters give narrow orientation tuning that can discriminate multiple orientations at each location in the input patch.

The third transformation type is Difference of Gaussians (DoG) transformation. This generally involves computing two isotropic DoG responses with different center scales at each of a set of sample points in the image patch. Generally, the previously smoothed image patch is convolved with three Gaussians (a second center and two surrounds). The result of this procedure is two linear DoG filter outputs A and B. More particularly, the image patch is convolved with the previously discussed smoothing Gaussian filter having the standard deviation $\sigma_{smoothing}$. The smoothed image patch is then convolved with the first of the two surround Gaussian filters. The standard deviation of this filter is designated as $\sigma_2$. The negative of the result of the second convolution is combined with the smoothed image patch to produce the output A. Additionally, the smoothed image patch is convolved with second center Gaussian filter (having a standard deviation designated as $\sigma_3$), and separately with the second of the two surround Gaussian filters (having a standard deviation designated as $\sigma_4$). The negative of the results of the convolution with the second surround filter is combined with the result of the convolution with the second center filter, to produce the output B.

In view of the foregoing, it is evident that the Gaussian filter used to smooth the image patch sets the size of the first DoG center (i.e., $\sigma_1$). The size of the second DoG center is set to have a prescribed standard deviation value. In one example, the prescribed standard deviation value of the second DoG center was set at around four times that of $\sigma_1$. Thus, the effective size of the first DoG surround, which is associated with the first DoG center, is given by $\sqrt{\sigma_1^2+\sigma_2^2}$. The effective size of the second DoG center is given by $\sqrt{\sigma_1^2+\sigma_3^2}$. And finally, the effective size of the second DoG surround, which is associated with the second DoG center, is given by $\sqrt{\sigma_1^2+\sigma_4^2}$. It is noted that the ratio of the effective size of each DoG surround to the effective size of its associated DoG center, is set to a prescribed value R. Thus, given the standard deviation of the first and second DoG centers, the standard deviations of the two DoG surrounds can be computed as follows:

$$\sigma_2: \frac{\sqrt{\sigma_1^2+\sigma_2^2}}{\sigma_1} = R \text{ so } \sigma_2 = \sqrt{(R\sigma_1)^2 - \sigma_1^2}$$

-continued $$\sigma_4: \frac{\sqrt{\sigma_1^2 + \sigma_4^2}}{\sqrt{\sigma_1^2 + \sigma_3^2}} = R \text{ so } \sigma_4 = \sqrt{R^2\sigma_1^2 + R^2\sigma_3^2 - \sigma_1^2}$$

In one example, the prescribed ratio can be set to 1.4.

The two linear DoG filter outputs A and B are then used to generate a length k=4 DoG vector for each sample point by rectifying the responses as follows:

{|A|−A; |A|+A; |B|−B; |B|+B}

1.1.2.3 Spatial Pooling

In the spatial pooling stage, vectors generated in the transformation stage are weighted and spatially accumulate to produce N linearly summed vectors of length k. These summed vectors are concatenated to form a descriptor of kN dimensions. In one example, N∈{3, 9, 16, 17, 25}. More particularly, in one example, each linearly summed vector is computed by summing the transform vectors associated with sample points found within a local pooling region. Each local pooling region is centered on a pooling point, which is part of a pattern of pooling points located across the image patch. In addition, each transform vector used to produce a linearly summed vector is weighted prior to the summing using a normalized Gaussian weighting function associated with the local pooling region. Example spatial arrangements of the pooling points, and an exemplary weighting technique will now be described. However, it should be noted that other arrangements could also be employed.

1.1.2.3.1 An n×n Array of Pooling Points

In this example of the spatial pooling stage, the aforementioned normalized Gaussian weighting functions are used to sum transformation vectors over local pooling regions arranged in an n×n array. For instance, 3×3, 4×4 and 5×5 arrays of pooling points can be employed. The size of the normalized Gaussian weighting functions defines the local pooling region and increasing them with the distance from a central location in the pooling point pattern produces better results. Thus, the weighting functions can vary from pooling point-to-pooling point. In addition, overlapping the extents of the Gaussian weighting functions should be kept to a minimum. Finally, the pooling points need not be equidistant from each other. In fact, spreading out the pooling points into a more polar arrangement, where groups of the points fall on concentric circles of increasing radii from a central location of the array, can produce better results.

1.1.2.3.2 Polar Arrangement of Pooling Points

In another example of the spatial pooling stage, the aforementioned normalized Gaussian weighting functions are used to sum transformation vectors over local pooling regions in a polar arrangement. The polar arrangement involves a central pooling point surrounded by one or more rings of equally spaced pooling points. Each ring is located at a prescribed radial distance from the central pooling point. In addition, the number of pooling points associated with each ring is prescribed and can vary from ring-to-ring. Still further, the rotational angle of the rings to one another in configurations having more than one ring is prescribed. As with the array configuration, the size of the normalized Gaussian weighting functions defines the local pooling region and better results can be obtained if they increase with the distance from a center pooling point. As such, the weighting functions can vary from pooling point-to-pooling point. Also as before, if any overlap between the extents of the Gaussian weighting functions is kept to a minimum, better results can be obtained.

1.1.2.4 Normalization

In the normalization phase, the descriptor produced from the spatial pooling phase is normalization to remove its dependency on image contrast by reducing the dynamic range of the descriptor. Any appropriate normalization procedure can be employed. For example, a range clipping normalization technique is one appropriate choice. This technique involves range clipping the descriptor elements. First, the descriptor is normalized to a unit vector. Next, for each element (i.e., number) of the descriptor, it is then determined if the element exceeds a prescribed threshold value. If so, the element is replaced with the threshold value. If not, the element is left as is. This clipping procedure can be accomplished mathematically by computing:

$v_i' = \min(v_i, \kappa)$ where $v_i$ is the $i^{th}$ descriptor element as output from the spatial pooling phase, $\kappa$ is the aforementioned prescribed threshold value, and $v_i'$ is the $i^{th}$ descriptor element of the clipped descriptor. The prescribed clipping threshold value can range between $1/\sqrt{kN}$ and 1.

Once all the descriptor elements have been processed, the resulting clipped descriptor is re-normalize to a unit vector. The resulting vector is then designated as an image descriptor.

1.2 Image Descriptor Quantization

In a typical application, each number of the vector representing an image descriptor is rescaled into the range 0-255 so that it can fit into a byte. The resulting bytes making up the descriptor are then stored in a database, or used as a query in an attempt to find a match to other similarly rescaled image descriptors already stored in a database. For a typical image descriptor, this can mean that up to 128 bytes are stored per descriptor.

1.2.1 Scaling Down

It has been found that scaling down each number in the vector representing an image descriptor so as to range between 0-7 (i.e., 3 bits), or even between 0-3 (i.e., 2 bits) in some cases, does not significantly affect matching performance. The foregoing level of dynamic range reduction substantially reduces the storage requirements and can also reduce the computation requirements when dealing with the descriptors. It is noted that higher ranges, such as 0-15 (i.e., 4 bits) and above, could also be used. However, it was found that there is not an appreciable increase in matching performance over the 3 bit range.

Figure 2:
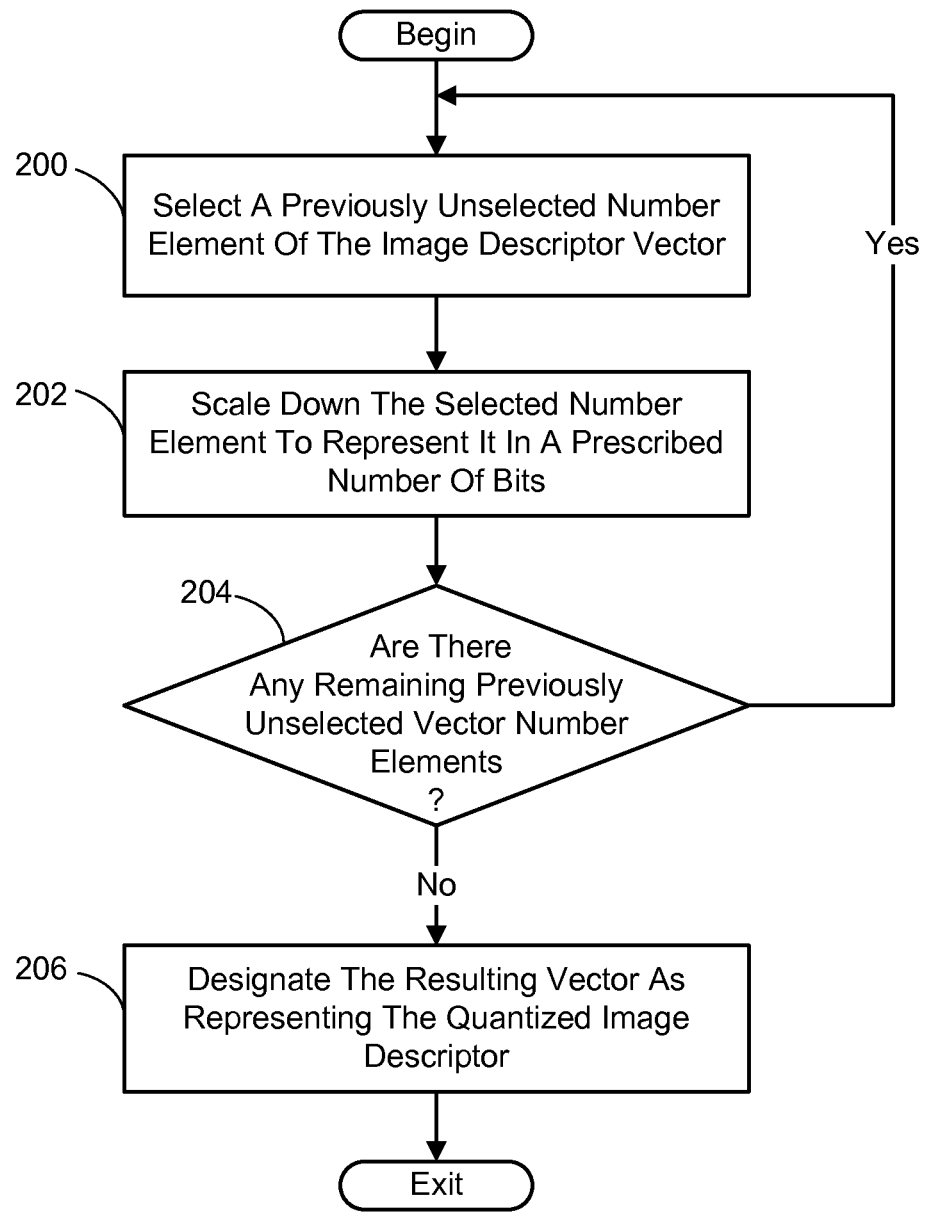
FIG. 2 is a flow diagram outlining an implementation of the process for quantizing an image descriptor that involves scaling down the descriptor number elements.

Referring to FIG. 2, the foregoing scaling down can be implemented in one embodiment by first selecting a previously unselected number element of a vector representing an image descriptor (200). The selected number element is scaled down proportionally, so that it can be represented in a prescribed number of bits less than eight (202). It is then determined if there are any remaining previously unselected number elements of the vector (204). If so, actions 200 through 204 are repeated. When all the number elements have been considered, the resulting vector is designated as representing the quantized image descriptor (206), and the process ends.

1.2.2 Dividing Down

An alternate way of quantizing an image descriptor is to divide the number elements down to fall within a prescribed range. Mathematically, this can be described as:

$$\text{Floor}[V/Q], \tag{1}$$

where V is the number element and Q is a quantizing factor. The aforementioned range of 0-7 (i.e., 3 bits) can be achieved by dividing a byte-sized number element by 32, and the aforementioned range 0-3 (i.e., 2 bits) can be achieved by dividing a byte-sized number element by 64.

Figure 3:
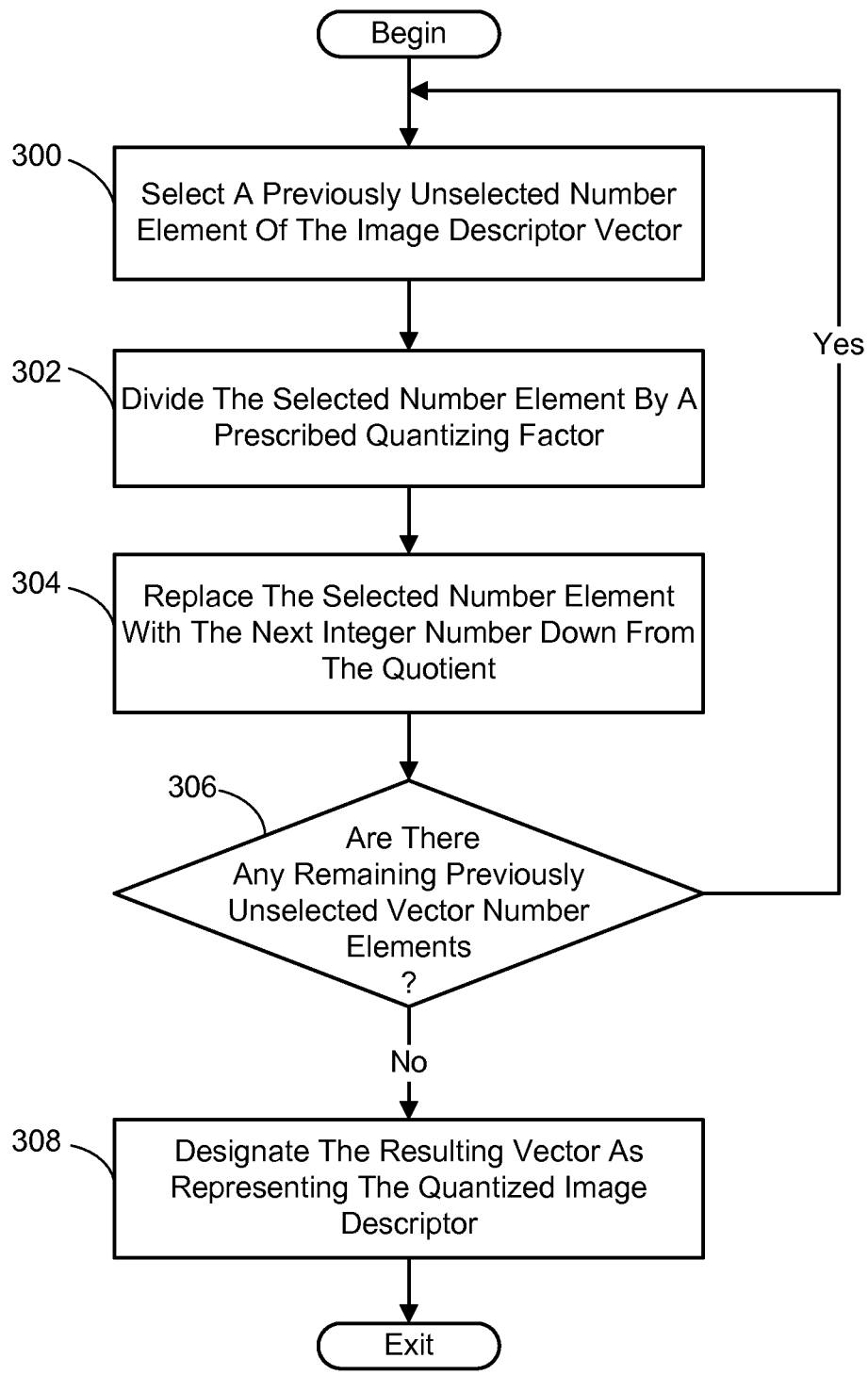
FIG. 3 is a flow diagram outlining an implementation of the process for quantizing an image descriptor that involves dividing the descriptor number elements.

Referring to FIG. 3, the foregoing dividing down can be implemented in one embodiment by first selecting a previously unselected number element of a vector representing an image descriptor (300). The selected number element is divided by a prescribed quantizing factor (302). The next lower integer number represents a quantized number element and is used to replace the selected element (304). It is then determined if there are any remaining previously unselected number elements of the vector (306). If so, actions 300 through 306 are repeated. When all the number elements have been considered, the resulting vector made up of now quantized number elements is designated as representing the quantized image descriptor (308), and the process ends.

1.3 Repeated Normalization

It has been found that the image descriptor quantization technique embodiments described herein can provide even better matching reliability if the original image descriptor undergoes normalization, such as that described in Section 1.1.2.4 in connection with the exemplary image descriptor generation process. Further, it has been found that repeating the normalization process multiple times can enhance the matching reliability even more. In general, the normalization can be repeated between 2 and 10 times to achieve the desired effect. In tested embodiment, the normalization process was repeated 5 times with success.

2.0 The Computing Environment

A brief, general description of a suitable computing environment in which portions of the image descriptor quantization technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
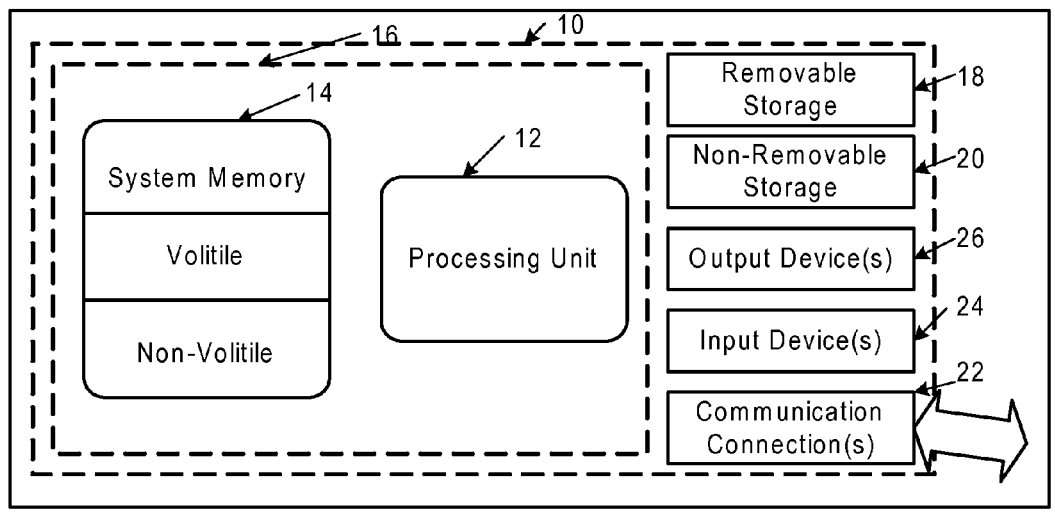
FIG. 4 is a diagram depicting a general purpose computing device constituting an exemplary system for implementing image descriptor quantization technique embodiments described herein.

FIG. 4 illustrates an example of a suitable computing system environment. The computing system environment is only one example of a suitable computing environment and is not intended to suggest any limitation as to the scope of use or functionality of image descriptor quantization technique embodiments described herein. Neither should the computing environment be interpreted as having any dependency or requirement relating to any one or combination of components illustrated in the exemplary operating environment. With reference to FIG. 4, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 4 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 4 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The image descriptor quantization technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

3.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for quantizing an image descriptor of a type comprising a vector of number elements, said process comprising using a computer to perform the following process actions:
    normalizing the image descriptor to a unit vector;
    clipping all the descriptor number elements that exceed a prescribed threshold to the value of the threshold to produce a clipped image descriptor;
    re-normalizing the clipped image descriptor to a unit vector;
    repeating the normalizing, clipping and re-normalizing actions a prescribed number of times;
    for each number element,
        dividing the number element by a prescribed quantizing factor to produce a resulting quotient, and replacing the number element with the next lower integer number to the resulting quotient; and designating a resulting vector as representing a quantized image descriptor.

2. The process of claim 1, wherein each number element ranges between 0 to 255, and wherein the prescribed quantizing factor is 32.

3. The process of claim 1, wherein each number element ranges between 0 to 255, and wherein the prescribed quantizing factor is 64.

4. The process of claim 1, wherein the prescribed number of times that the normalizing, clipping and re-normalizing actions are repeated ranges between 2 and 10.

5. The process of claim 1, wherein the prescribed number of times that the normalizing, clipping and re-normalizing actions are repeated is 5.

* * * * *